United States Patent [19]
Marotta

[11] 3,846,537
[45] Nov. 5, 1974

[54] PROCESS OF PREPARING SILICA XEROGELS

[75] Inventor: Ralph Marotta, St. Louis, Mo.

[73] Assignee: Monsanto Company, St. Louis, Mo.

[22] Filed: Aug. 21, 1972

[21] Appl. No.: 282,641

[52] U.S. Cl. ............................................ 423/338
[51] Int. Cl. ........................................ C01b 33/12
[58] Field of Search ............ 423/349, 334, 338, 339

[56] References Cited
UNITED STATES PATENTS
3,428,425  2/1969  Marotta .............................. 423/339
FOREIGN PATENTS OR APPLICATIONS
159,508  8/1922  Great Britain ...................... 423/338

Primary Examiner—Oscar R. Vertiz
Assistant Examiner—Ethel R. Cross
Attorney, Agent, or Firm—William H. Duffey

[57] ABSTRACT

Silica xerogels having improved properties as flatting agents are prepared by the steps of (a) forming a semi-stable silica sol below pH 4 and below 70°C., using a minor portion of the batch silicate charge, (b) shutting off the batch agitator and gelling the sol below 70°C. and pH 4 or higher, (c) allowing the gel to grow in firmness without agitation, (d) dispersing the gel with agitation and continuing silicate and acid charging at about 87°C. and about pH 5.3, and (e) recovering the silica product.

9 Claims, No Drawings

PROCESS OF PREPARING SILICA XEROGELS

BACKGROUND OF THE INVENTION

1. Field of the Invention

This invention relates to precipitated silica particles and to processes for preparing the same. More particularly, this invention relates to the production of an amorphous, pulverulent silica xerogel which is produced by reacting aqueous alkali metal silicate solutions with an acidification agent, followed by a gelation step and a particle reinforcing step. The resulting xerogels exhibit greater efficiency than known xerogels in various applications such as flatting agents in organic coatings. The xerogels produced by the present invention may also be used as active coatings for carbonless paper systems; as thixotropic agents for thickening greases; as reinforcing agents; as flowing agents; and for insulation.

2. Description of the Prior Art

Prior to the present invention, it was known that silica could be prepared by the reaction of alkali metal silicate solutions with acids. Some of these prior art processes are referred to hereinafter.

In U.S. Pat. No. 3,428,425 there is described a process for producing a finely divided, dry, amorphous silica xerogel having certain properties which render such xerogel especially useful as a thickening and/or thixotropic agent when incorporated in various organic materials such as oil. The xerogel produced therein has a specific surface area of 300 to 600 square meters per gram and a linseed oil absorption of about 3 to 5 cc's per gram. The xerogel has an average ultimate particle size of 0.01 to 0.03 micron with pore volumes of 0.5 to 1.0 cc's per gram, pore diameters of 35 to 90 A. and average bulk density of 3 to 7 pounds per cubic foot. These products are prepared by the simultaneous addition of an alkali metal silicate with a mineral acid to a solution maintained at a pH of less than 6.0 and a temperature less than 50°C. After a substantial portion of the reactants has been added, the temperature is raised to 70°–95°C. and the remaining reactants are added over a period of 1 to 3 hours to obtain a slurry containing 3 to 10% $SiO_2$. The silica xerogel thus produced has a ratio of linseed oil absorption to specific surface area of less than 1:1.

In U.S. Pat. No. 3,243,262, there is described a process for preparing microspheroidal silica having a surface area of about 300 to 1,000 square meters per gram and a pore volume of about 0.5 to 1.25 cc's per gram. The process comprises (a) diluting a sodium silicate solution to a silica content of about 3 to 8 percent; (b) reacting the silicate with $CO_2$ to form a silica gel; (c) aging the gelled silicate at a minimum of 100°F. for about 30 minutes to 2 hours; (d) adding sulfuric acid to the reaction mixture in sufficient quantity to adjust the pH between 4.5 and 8.0; (e) spray-drying the reaction mixture; (f) washing to remove solution impurities; and (g) drying and recovering the silica product.

In U.S. Pat. No. 2,731,326 there is described a process in which active silica, i.e., silica having a low degree of polymerization, is said to accrete to supercolloidal aggregates having reticulated structures of open-packed, dense, amorphous silica spheroids which are from 5 to 150 millimicrons in diameter, by releasing active silica (which, for example, has been prepared by partially neutralizing a soluble sodium silicate with sulfuric acid in the pH range of 8 to 11) in an aqueous suspension of the aggregate while maintaining the pH of the suspension at 8 to 11, an alkali metal ion concentration below 1 normal, and the temperature in the range from 60°C. to 125°C. The release of active silica is stated to be effected at a rate such that the specific surface area of the precipitated silica present decreases and the end products are described as pulverulent, dry gels having a specific area of from 60 to 400 square meters per gram and consist of super-colloidal aggregates of reticulated spheroidal units. The linseed oil absorption, in milliliters per 100 grams of solids, is from 1 to 3 times the specific area, in square meters per gram.

In U.S. Pat. No. 2,940,830, there is described a process for preparing finely divided precipitated silica which is stated to be suitable as a reinforcing pigment in rubber compositions. U.S. Pat. No. 2,940,830 specifically describes a process of preparing the aforementioned silica material, which is further characterized by having an average ultimate particle size of 0.015 to 0.004 micron and a surface area of 25 to 200 square meters per gram by the controlled rate of addition of acid to an alkali metal silicate wherein the resultant slurry is constantly maintained at a pH above 7 in order to achieve the aforementioned end product characteristic.

Canadian Patent No. 713,984 discloses a method of providing a precipitated silica which is stated to be useful as a reinforcing agent for rubber. More specifically, that patent discloses a process wherein a pool of an aqueous alkali metal silicate solution is established and thereafter an aqueous alkali metal silicate solution and acid are simultaneously added to the pool. The patentee points out that this simultaneous addition is continued until the viscosity of the pool rises through a maximum and then falls to a substantially lower value. The amount of the acidification agent and the alkali metal silicate are so proportioned as to maintain the pH of the resulting slurry substantially constant throughout the major portion of the reaction in the range of about 10 to 12. The process is generally conducted at a temperature of 80° to 90°C. and the end product, after drying, is said to usually result in a silica which may have a surface area of 260 square meters per gram and which the patentee points out has been particularly satisfactory as a reinforcing agent for rubber.

Flatting agents containing silica are disclosed in U.S. Pat. No. 2,625,492 for use in reducing the gloss of a surface. Typical uses of those flatting agents are said to be in photographic emulsions, printing inks, lacquers and varnishes. The silica flatting agent of U.S. Pat. No. 2,625,492 is prepared from silica hydrogel. The silica hydrogel used as a starting ingredient may vary from 6 or 7 percent silica up to about 17 percent or more silica. No particular method of preparing the hydrogel is said to be required by the patentee and the usual method is to prepare the hydrogel by the neutralization of an alkaline silicate solution with an acid. Treating of the silica hydrogel is then accomplished by passing an ammonia-containing solution in contact with the gel. U.S. Pat. No. 2,625,492 claims a non-hard-settling silica gel impregnated with small amounts of a soluble inorganic fluorine compound selected from the group consisting of sodium fluoride, potassium fluoride, ammonium fluorosilicate, zinc fluorosilicate, magnesium fluorosilicate, hydrofluoric acid and hydrofluorosilicic acid.

In contradistinction to the processes described in the prior art, the process of the present invention provides particularly efficient silica flatting agents for coatings. Thus, as flatting agents in organic coatings, the products produced by the present invention exhibit greater efficiency than known xerogels. This improved efficiency will be illustrated in the examples provided hereinafter.

It is accordingly a primary object of this invention to provide a novel method of preparing silica xerogels. It is a further object of this invention to provide silica xerogels having improved efficiency as flatting agents for coatings, especially organic coatings. Another object of the present invention is to provide an improved method of preparing silica xerogels wherein conveniently available raw materials are employed. Other objects and advantages of the present invention will become apparent from the following description and the appended claims.

SUMMARY

In accordance with the present invention, silica xerogels having improved properties are prepared by the steps of (a) forming a semi-stable silica sol below about pH 4 and below about 70°C., using a minor portion of the batch silicate charge; (b) shutting off the batch agitator and gelling the sol below about 70°C. and at a pH of about 4 or higher; (c) allowing the gel to grow in firmness without agitation; (d) dispersing the gel with agitation and continuing silicate and acid charging at a temperature of from about 82°C. to about 92°C. and at a pH of about 4.0 to 6.6; and (e) recovering the silica product.

After fluid energy grinding, the dried, powdered, silica products have essentially the following physical properties:

| | |
|---|---|
| Linseed Oil Absorption | 1.3–3.3 cc oil/g. |
| Surface Area | 100–300 m$^2$/g. |
| Ratio Linseed Oil Absorption/Surface Area as cc oil/100 g./S.A. in m$^2$/g. | Greater than 1 |
| Pore Volume | 0.3–0.8 cc/g. |
| Particle Shape by Scanning Electron Microscope | Irregular |
| Average Particle Size | 1–30 microns |
| Bulk Density | 0.06–0.16 g/cc |

The improved properties of the silica products produced by the process of this invention make the products especially suitable as flatting agents in organic coatings. The gelling step taught by the present invention allows control and variations of the desired silica products. Initial gelling is afforded by increasing the batch ph to at least 4.0, preferably pH 5.3 ± 1.3. Batch temperature during the gelation stage may be from 50°–70°C., preferably 58°–66°C. The particle reinforcing portion of the reaction may take place at 75°–100°C., preferably 86°C. ± 6°C. with a pH of 5.3 ± 1.3.

DESCRIPTION OF PREFERRED EMBODIMENTS

The preferred starting materials for the practice of this invention are the alkali metal silicates together with a mineral acid. Sodium silicates are preferred because of their lower cost compared to other alkali metal silicates. Examples of mineral acids which are suitable for the present purposes include phosphoric, nitric, hydrobromic, hydrochloric and sulfuric acids. Of these, hydrochloric and sulfuric acids are preferred, and sulfuric acid is particularly preferred due to its comparatively lower cost.

It should be understood that any mineral acid other than hydrofluoric acid (which reacts with silica) may be used. While it has been found that a sulfuric acid solution having an acid concentration of from about 5 percent to about 99 percent by weight is suitable for use with the present invention, standard commercially-available 93% H$_2$SO$_4$ is preferred due to its lower cost and favorable melting point characteristics in storage.

There are four fundamental steps embraced by the method of the present invention. The first step is the silica sol nuclei formation step. The second step is the gelling, dispersing and heat-up step. The third step is the particle reinforcing step. The fourth step is the silica recovery step.

A further understanding of the process of this invention will be obtained from the following specific examples which are intended to illustrate the invention, but not to limit the scope thereof, parts and percentages being by weight unless otherwise specified.

EXAMPLE I

Step 1 - Silica Sol Nuclei Formation 4,450 gms. water contained in a stainless steel reactor were heated to 42°C. Then 355 cc of 40° Be sodium silicate (3.25/1 SiO$_2$/Na$_2$O) and about 100 g. of 38% H$_2$SO$_4$ were added simultaneously in about 31 minutes, starting at 42°C. and finishing at 65°C., maintaining vigorous agitation and pH 3.4 ± 0.5. This gave a transparent semi-stable colloidal silica sol containing 2.7% SiO$_2$.

Step 2 - Gelling, Dispersing and Heat-Up

Acid flow was shut off, but about 10 cc additional sodium silicate was continued at 65°C. to pH 5.3 ± 1.3 to induce gelation (22.1 percent of total batch silicate thus far). The stirrer was quickly shut off and within seconds the clear to slightly turbid static liquid batch became a homogeneous gel. Undisturbed, the thin gel was allowed to grow in firmness during about 1 minute. Then the stirrer was turned on to break up and disperse the gel to a thixotropic slurry, while the batch was being heated to 80°C. during 28 minutes. For good agitation, maximum stirring power was required during the first 5 to 10 minutes after turning on the stirrer; then, less power as lower viscosity was exhibited.

Step 3 - Particle Reinforcing

Additional 1285 cc of sodium silicate feed and about 635 gms. of adjunct 37% H$_2$SO$_4$ were then started, adding the silicate at 13.7 cc/minute to the batch held at 80°C. and pH 5.3 ± 1.3. When all feeds are in, the heat supply and stirrer were turned off and the slurry allowed to age a short time to improve flocculation for subsequent filtration.

Step 4 - Silica Recovery

The warm batch was then agitated and filtered, using filter paper in a 10-inch Buchner vacuum funnel. The amorphous silica cake was washed through the filter with 1.7 gallons water and the desalted wet cake containing about 20 percent silica was pan dried in an oven at 175°C. Surprisingly, the silica became a flowable powder upon drying. However, it was then reduced to a finer powder (for coatings and other applications) by grinding it in a fluid energy mill, Model 202 Jet-O-Mizer, using 135°C. air at 75–95 psig. The resulting product exhibits excellent flatting efficiency.

EXAMPLE II

This batch was a duplicate of Example I with the exception that in Step 2 the stirrer was not shut off at any time. When gelling conditions were approached at pH 5.3 ± 1.3, the batch became turbid and then a fine, well dispersed gelatinous silica was produced. Heating was continued to 80°C. but the high viscosity which occurred in Example I and which required much more stirring power did not develop in Example II. The batch remained a very thin gel throughout, never achieving the gel toughness of Example I. Subsequently in Step 3 the gel particles were too small to achieve properly reinforced amorphous particles for the intended uses. The batch was finished as in Example I. When tested as a flatting agent in a nitrocellulose lacquer, poor flatting efficiency was obtained.

EXAMPLE III

Reactor

The reactor was a 55-gallon jacketed stainless steel Pfaudler equipped with two 1¼ inch O.D. pipe baffles 2½ inches from reactor walls and stirrer with two 15 inches four-blade turbine type impellers. The stirrer was wired for reverse impeller agitation for downward pull of the liquid batch to minimize vortex. A 4 inches diameter stack was attached to the somewhat loosely fitted reactor cover.

Step 1 - Silica Sol Nuclei Formation 32.5 Gals. water were introduced into the reactor. With stirrer on, the water was heated to 42°C. Then 34.12 lbs. of 40° Be sodium silicate (3.25/1 $SiO_2/Na_2O$) and about 5.75 lbs. of 93.2% $H_2SO_4$ were simultaneously metered in at pH 3.4 ± 0.4 during 31 minutes, starting at 42°C. and ending at 61.5°C. The clear sol contained 3.08% $SiO_2$.

Step 2 - Gelling, Dispersing and Heat-Up

Acid flow was shut off but about 1.12 lbs. more silicate was flowed in until the clear sol became turbid at pH 5.2 ± 0.8. Immediately silicate feed and stirrer were shut off. Within seconds gelation started at reactor walls and proceeded quickly towards the batch center. From start of gelation the batch remained undisturbed 6½ minutes, allowing the gel to grow in firmness. The stirrer was then turned on and adjusted to relatively high speed to break up and begin dispersion of the 3.18% $SiO_2$ gel. Jacket steam was also turned on. After 10 minutes, the dispersed slurry at 68°C. attained appreciably lower viscosity. The batch was heated to 85°-87°C. in 29 minutes from start of gel agitation.

Step 3 - Particle Reinforcing

The remaining 117.75 lbs. silicate feed and about 19.1 lbs. of 93.2% $H_2SO_4$ were then added simultaneously at pH 5.3 ± 1.3 and steady rate during 105 minutes. One minute later 180 cc of 28% $NH_3$ aqueous ammonia was added to about pH 6 to aid subsequent filtration. The stirrer, steam and vent were shut off and the batch allowed to age about 1.5 hours before silica recovery.

Step 4 - Silica Recovery

Separation of the silica from the slurry was done in a Tolhurst 26 inches centerslung, v-belt drive centrifuge using a polypropylene filter liner. Since the batch filter cake would be twice the centrifuge capacity, silica recovery was done in two portions, each using 187 lbs. of silica slurry.

The 187 lbs. of slurry at 77°C. was fed in 9 minutes to the centrifuge which was rotating at 300 rpm. Then 10 gallons of tap water wash at 26.5°C. was added at 0.6 gal/minute and 300 rpm centrifuge speed. Ten more gallons of tap water wash at 26.5°C. was introduced at 1.1 gal/minute and 600 rpm centrifuge speed. Then 50 gallons of $H_2O$ slightly acidified with $H_2SO_4$ was added at 1.1 gal/minute and 600 rpm centrifuge speed. Centrifuge spinning was continued for about 10 minutes. Progress of salts removal was monitored in the filtrate by insertion of a calibrated cell attached to a conductivity bridge. The 100 lbs. recovered wet cake was dried at 173°C. overnight to 22.0 lbs. dry semi-powder.

The second 187 lbs. of reaction slurry was centrifuged, washed and oven driven to yield another 22.0 lbs. dry semi-powder. The two fractions were mixed and then finely ground by fluid energy in a Sturtevant 4-inch Micronizer using air at 150°C. and 47 psig. The resulting product exhibits excellent flatting efficiency.

EXAMPLE IV

An important utility for silica flatting agents is in the delustering of furniture lacquers. To illustrate the superior flatting efficiency of the silica xerogels of the present invention, a gloss comparison test was conducted with four other flatting silica xerogels. The commercial lacquer employed was "Duco 1655 Gloss Lacquer" from E. I. du Pont de Nemours & Co. which contained 27 percent non-volatiles.

For each of the five flatting silicas tested, 1.52 g. of fine powder was wetted into 180 g. aliquots of the lacquer and dispersed in a Waring Blender to a Hegman fineness of 5 to 6. Wet films 0.003 inch thick were cast on black glass, allowed to dry for 24 hours and 14 days, respectively, and were tested for gloss. The comparative results are set forth in Table I below wherein lower gloss values indicate greater silica efficiency for flatting.

TABLE I

| SILICA XEROGEL TYPE | WET FILM THICKNESS (inches) | DURATION OF AIR DRYING AT 25°C. | GLOSS READING 60° ngle | 85° Angle |
|---|---|---|---|---|
| Xerogel of present invention | .003 | 24 hours | 27.5 | 47 |
|  | .003 | 14 days | 26.5 | 45 |
| SYLOID 83[1] | .003 | 24 hours | 40.5 | 73 |
| (See U.S.P. 2,625,492) | .003 | 14 days | 39 | 70 |
| SYLOID 244[1] | .003 | 24 hours | 35 | 64.5 |
|  | .003 | 14 days | 33 | 61 |
| OK 412[2] | .003 | 24 hours | 41 | 79.5 |
|  | .003 | 14 days | 38 | 77 |
| ZEOTHIX 95[3] | .003 | 24 hours | 44.5 | 74.5 |
|  | .003 | 14 days | 42 | 72 |

[1] W. R. Grace Co.
[2] De Gussa (Germany)
[3] J. M. Huber Corp.

From the results in Table I above, it can be observed that the silica xerogel prepared according to the teachings of this invention exhibits remarkably superior flatting efficiency in a commercially available lacquer, when compared to known flatting silicas which are also xerogels.

Criticality of the gelation step within the process of this invention is illustrated in the foregoing Example II. Although Example II was a duplicate of Example I except for certain deviations in Step 2 (the gelling, dispersing and heat-up step), it can be observed that the silica product of Example II exhibited poor flatting efficiency in comparison to the efficiency of the product of Example I.

A silica xerogel product of the present invention was tested by a carbonless paper supplier by dispersing the product in water and using it as an active coating in their carbonless paper system wherein no external supply of ink is required. The silica xerogel product was judged satisfactory by the user for this application.

Physical characteristics of the xerogels produced by the process of this invention were hereinbefore described. Those characteristics were ascertained in the following manner. The linseed oil absorption number was obtained by the procedure set forth in the article "Oil Absorption of Pigments," ASTM Standards, 1955 Part IV, p. 197. The specific surface area of the end product was determined by the nitrogen absorption method described by Brunauer, Emmett, and Teller (BET) in the "Journal of the American Chemical Society," volume 60, P. 309, published in 1938. The bulk density was determined by pouring a 100 cc. sample of the product, after it was ground in a mortar with a pestle, into a 100 cc. graduated cylinder which had been preweighed and then the cylinder containing said product was reweighed and the loose bulk density computed from these measurements.

It can be seen that the gelation step is the point in the process of this invention which affords control of, and variations in, the desired silica products. Initial gelling is allowed to occur by increasing the bath pH to at least about 4.0, preferably pH $5.3 \pm 1.3$. The preferred limits for nuclei silica present at the start of gelation are 10–45 percent by weight of the final batch silica, more preferably 15–32 percent.

Batch temperature during the gelation stage may be from about 50°–70°C., 58°–66°C. being preferred. Gelation time without agitation has been found to vary with the diameter of the reactor vessel. A batch within a 2-ft. diameter reactor may be allowed approximately 6 minutes without stirring from the start of gelation. In a larger reactor the time may be longer. While excessive times at gelation condition are disadvantageous, it has been found important that a batch be allowed to remain undisturbed in a gelled state for at least one-half minute.

It has been found herein that the particle reinforcing step of the reaction may take place at about 75°–100°C. preferably $86° \pm 6°C.$ with a pH of $5.3 \pm 1.3$. Silica concentration in the final batch slurry may vary from 6 percent to 20 percent by weight although 8–16 percent is preferred. Batches with the larger silica concentration have been found to yield products exhibiting higher bulk density, lower linseed oil absorption, and lower specific surface area. The lower silica absorption and higher surface area.

Use of minimum silica nuclei at the sol stage yields final silica powder with high bulk density, low linseed oil absorption, and low specific surface area. Higher silica nuclei results in products with lower bulk density, higher linseed oil absorption and higher surface area.

While the present invention has been described with respect to particular embodiments thereof, it will be understood that numerous modifications may be made by those skilled in the art without departing from the spirit and scope of the appended claims.

The embodiments of this invention in which an exclusive property or privilege is claimed are defined as follows:

1. A process of preparing an amorphous, pulverulent silica xerogel which comprises the steps of:
   a. forming a silica sol by feeding, to an agitated aqueous heel, an alkali metal silicate solution and a mineral acid other than hydrofluoric acid, while maintaining a batch pH of less than about 4 and a batch temperature below about 70°C., the weight of silica added during this step (a) being from about 10 percent to about 45 percent of the total silica to be added during said process;
   b. gelling said sol at a batch pH of about 4 or higher and a batch temperature of about 50°C. to 70°C., and interrupting the agitation for at least about 30 seconds;
   c. resuming said agitation to disperse the gel;
   d. introducing additional alkali metal silicate solution and acid while maintaining a batch pH of from about 4 to about 6.6 and a batch temperature of from about 75°C. to about 100°C.; and
   e. recovering the silica xerogel product.

2. A process of claim 1 wherein the silica sol is gelled at a batch pH of from about 4 to about 6.6 and a batch temperature of from about 58°C. to about 66°C.

3. A process of claim 1 wherein the gel is dispersed at a batch temperature of from about 82°C. to about 92°C.

4. A process of claim 1 wherein the major portion of silica introduced during said process is added at a batch temperature of from about 82°C. to about 92°C.

5. A process of claim 1 wherein the alkali metal silicate is sodium silicate.

6. A process of claim 1 wherein the mineral acid is sulfuric acid.

7. A process of claim 1 wherein the silica introduced in step (a) comprises from about 15 percent to about 32 percent of the silica added during said process.

8. A process of claim 1 wherein the agitation is interrupted for at least about 6 minutes.

9. A process of claim 1 wherein the silica concentration in the final batch slurry is from about 6 percent to about 20 percent by weight.

* * * * *